3,214,438
3-SUBSTITUTED INDOLES

Gilbert A. Youngdale, Kalamazoo, Mich., assignor to The Upjohn Company, Kalamazoo, Mich., a corporation of Delaware
No Drawing. Filed Oct. 14, 1963, Ser. No. 316,138
4 Claims. (Cl. 260—319)

The present invention relates to novel 1-(2-diethylaminoethyl)-3-(1-methyl-2-pyrrolidinyl)indole free base and dihydrochloride thereof having the formula:

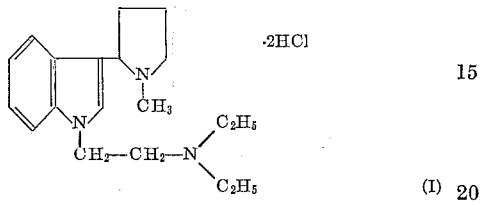

(I)

and to a novel intermediate useful in preparing the same.

The dihydrochloride of the present invention has demonstrated pseudocholinesterase inhibitory activity which is a valuable tool in producing selective stimulation and lucid intervals in confused mental states. Inhibition of this enzyme is determined manometrically using human serum as the enzyme source and acetylcholine chloride ($10^{-1}$ molar) as the substrate. Compounds producing less than 50 percent inhibition at $10^{-3}$ molar concentration are considered inactive. 1-(2-diethylaminoethyl)-3-(1-methyl-2-pyrrolidinyl)indole dihydrochloride of the present invention brought about 50 percent inhibition ($I_{50}$) of the enzyme at $6 \times 10^{-6}$ molar concentration.

In addition, the novel 1-(2-diethylaminoethyl)-3-(1-methyl-2-pyrrolidinyl)indole dihydrochloride of the present invention exhibits high absorption of radiation in the wave length range of 280–300 millimicrons and, accordingly, can be employed as an effective sun screen when incorporated in suitable vehicles such as transparent film-forming compositions and oils.

The compounds of the present invention can be prepared by the following series of reactions:

A. Reacting a 3-indolyl 2-aminoethyl ketone (prepared by the process disclosed in J. Amer. Chem. Soc. 82, 1180, 1960) having the formula:

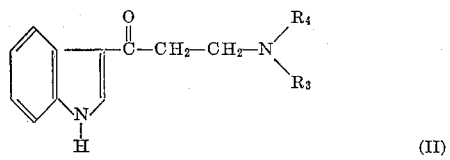

(II)

wherein $R_3$ and $R_4$ taken individually represent hydrogen, aryl, aralkyl, and alkyl, and $R_3$ and $R_4$ taken together with —N< also represent a saturated heterocyclic amino radical, with nitromethane to produce 3-(4-nitrobutyryl) indole having the formula:

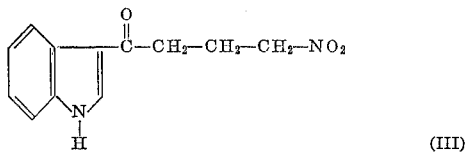

(III)

B. Reducing the 3-(4-nitrobutyryl)indole to the corresponding 3-(4-aminobutyryl)indole and concomitantly cyclizing the latter, utilizing hydrogen and Raney nickel catalyst, to produce 3-(1-pyrrolin-2-yl)indole having the formula:

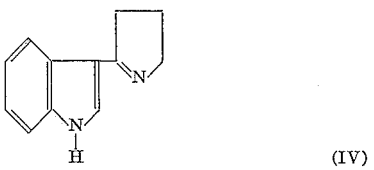

(IV)

C. Reacting the 3-(1-pyrrolin-2-yl)indole with methyl iodide to produce 3-(1-methyl-2-pyrrolidinylidene)-3H-indole hydroiodide, and basifying the latter to produce 3-(1-methyl-2-pyrrolidinylidene)-3H-indole free base having the formula:

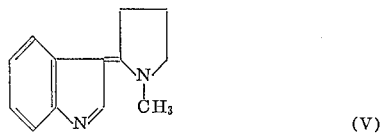

(V)

Compound V can also be prepared by reacting indole with 1-methyl-2-pyrrolidone in the presence of phosphrous oxychloride.

D. Reacting the 3-(1-methyl-2-pyrrolidinylidene)-3H-indole free base with 2-diethylaminoethyl chloride in the presence of an inert solvent such as methanol, ethanol, and the like, at a temperature between about 50° C. and about 125° C., preferably about 80° C., and basifying with an alkali-metal hydroxide to produce 1-(2-diethylaminoethyl)-3-(1-methyl-2-pyrrolin-2-yl)indole having the formula:

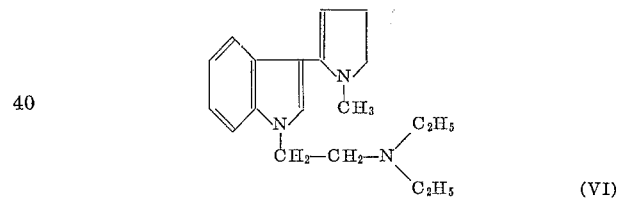

(VI)

E. Reducing the 1-(2-diethylaminoethyl)-3-(1-methyl-2-pyrrolin-2-yl)indole with a metal hydride, such as lithium aluminum hydride, lithium borohydride, and sodium borohydride, with sodium borohydride being preferred, to produce 1-(2-diethylaminoethyl)-3-(1-methyl-2-pyrrolidinyl)indole free base. The reduction is preferably conducted in the presence of an inert solvent, such as tetrahydrofuran, diisopropyl ether, diethyl ether, N-methylmorpholine, dioxane, and the like; in the case of sodium borohydride the inert solvent can also be a lower alkanol, preferably ethanol.

F. Reacting the 1-(2-diethylaminoethyl)-3-(1-methyl-2-pyrrolidinyl)indole free base dissolved in an organic solvent such as methanol, ethanol, isopropanol, ethyl acetate, diethyl ether, and the like, with hydrogen chloride to produce 1-(2-diethylaminoethyl)-3-(1-methyl-2-pyrrolidinyl)indole dihydrochloride.

The following example is illustrative of the product and process of the present invention but is not to be construed as limiting.

EXAMPLE

*1-(2-diethylaminoethyl)-3-(1-methyl-2-pyrrolidinyl) indole dihydrochloride*

A. *3-(4-nitrobutyryl)indole.*—A mixture of 3-dimethylamino-1-(3-indolyl)-1-propanone (129.6 g.; 0.6 mole), 600 ml. of nitromethane, and sodium methoxide (3.18 g.; 0.059 mole) was stirred and refluxed for 7 hr. while a slow stream of nitrogen was passed through the suspension. The mixture was allowed to crystallize and filtered. The solid was dissolved in 900 ml. of acetone, the solution was filtered to remove a small amount of insoluble material, 300 ml. of ethyl acetate was added to the filtrate, and the solution was then evaporated to about 500 ml. The resulting solid was filtered and washed with ether; 54 g. of 3-(4-nitrobutyryl)indole which melted between 178–180° C. was obtained.

*Analysis.*—Calcd. for $C_{12}H_{12}N_2O_3$: C, 62.06; H, 5.21; N, 12.06. Found: C, 61.91; H, 5.05; N, 11.84.

B. *3-(1-pyrrolin-2-yl)indole.*—A solution of 3-(4-nitrobutyryl)indole (12.3 g.; 0.053 mole) in 300 ml. of absolute ethanol was hydrogenated at 50 lb. (initial pressure of hydrogen) in the presence of 2 teaspoons of Raney nickel catalyst. The theoretical amount of hydrogen was absorbed in 18 hr. Three such runs were combined, filtered, and evaporated to give 28.9 g. of crude product which was crystallized from ethyl acetate to produce 16 g. of 3-(1-pyrrolin-2-yl)indole. After recrystallization from the same solvent, the compound melted between 182.5–183.5° C.

C. *3 - (1 - methyl - 2 - pyrrolidinylidene) - 3H - indole free base.*—Process (a): Methyl iodide (25 ml.) was added to a solution of 3-(1-pyrrolin-2-yl)indole (9.2 g.; 0.05 mole) in 75 ml. of methanol and the solution was refluxed for 1.5 hr. The resulting suspension was cooled in ice and filtered to give 11.3 g. (70% yield) of 3-(1-methyl-2-pyrrolidinylidene)-3H-indole hydroiodide melting between 270–283° C. Two recrystallizations from methanol afforded long needles, darkening at 280° C. and melting between 293–296° C. (dec.).

A suspension of 3-(1-methyl-2-pyrrolidinylidene)-3H-indole hydroiodide (1.6 g.; 0.005 mole) in 10 ml. of water, 25 ml. of benzene, 30 ml. of 1 N sodium hydroxide, 25 ml. of methylene chloride, and 10 ml. of methanol was shaken until two clear layers resulted. The aqueous layer was extracted twice with methylene chloride. The combined extracts and original organic layer were washed with saturated sodium chloride solution, dried over anhydrous sodium sulfate, and evaporated, to give 0.9 g. (91% yield) of 3-(1-methyl-2-pyrrolidinylidene)-3H-indole free base.

Process (b): Phosphorus oxychloride (40.8 g.; 0.26 mole) was added to 40 ml. (0.4 mole) of 1-methyl-2-pyrrolidone at such a rate that the temperature of the mixture did not exceed 15° C. The mixture was stirred for 20 minutes and a solution of 28.0 g. (0.24 mole) of indole and 40 ml. (0.4 mole) of 1-methyl-2-pyrrolidone was slowly added. The resulting mixture was then carefully heated to 35° C. The mixture was quickly immersed in an ice bath when the temperature began to rise. The temperature rose to 130° C. When the temperature dropped to 70° C., the mixture was heated at 80° C. for two hours, cooled and mixed with ice water. When the solution was clear, 42.0 g. of sodium hydroxide was added. The mixture was filtered and the solid material was washed with water. The solid was dissolved in 200 ml. of ethanol, the mixture was filtered and the filtrate was diluted at its boiling point with 300 ml. of water. After cooling for 1 hour, 41.6 g. (89% yield) of 3-(1-methyl-2-pyrrolidinylidene)-3H-indole free base was obtained, which product melted between 229–231° C.

*Analysis.*—Calcd. for $C_{13}H_{14}N_2$: C, 78.75; H, 7.12; N, 14.13. Found: C, 78.35; H, 7.18; N, 14.43.

D. *1 - (2 - diethylaminoethyl) - 3 - (1 - methyl - 2 - pyrrolin-2-yl)indole.*—A mixture of 10 g. (0.0505 mole) of 3-(1-methyl-2-pyrrolidinylidene)-3H-indole free base, 8.15 g. (0.06 mole) of 2-diethylaminoethyl chloride, and 300 ml. of absolute ethanol was heated under reflux for 16 hours. The solvent was removed under reduced pressure of the steam bath. The residual oil was dissolved in 150 ml. of water. The solution was basified by the addition of aqueous sodium hydroxide solution and extracted with two 400-ml. portions of ether. The combined ether extracts, which contained some insoluble solid, were washed with four 200-ml. portions of water and dried over anhydrous magnesium sulfate. The ether was evaporated, giving 11.9 g. of 1-(2-diethylaminoethyl)-3-(1-methyl-2-pyrrolin-2-yl)indole as a brown oil.

E. *1 - (2 - diethylaminoethyl) - 3 - (1 - methyl - 2 - pyrrolidinyl)indole free base.*—A mixture of the brown oil (Part D), 6 g. of sodium borohydride, and 250 ml. of absolute ethanol was allowed to stand for 16 hours at 25° C. The solvent was removed under reduced pressure on the steam bath. The residue was treated with 200 ml. of water. The mixture was extracted with two 400-ml. portions of ether. The combined ether extracts were washed with three 200-ml. portions of water and dried over anhydrous magnesium sulfate to produce an ether solution of 1-(2-diethylaminoethyl)-3-(1-methyl-2-pyrrolidinyl)indole free base.

F. *1 - (2 - diethylaminoethyl) - 3 - (1 - methyl - 2 - pyrrolidinyl)indole dihydrochloride.*—The ether solution of 1-(2-diethylaminoethyl)-3-(1-methyl-2-pyrrolidinyl) indole free base (Part E) was treated with ethereal hydrogen chloride. The solid which separated was collected by filtration and recrystallized twice from ethanol-ether, giving 10.3 g. (55% yield) of 1-(2-diethylaminoethyl)-3-(1-methyl-2-pyrrolidinyl)indole dihydrochloride as a pale violet solid which melted between 209–211° C. Another recrystallization from ethanol-ether afforded gray crystals which melted between 210–212° C.

Ultraviolet spectrum (ethanol) showed $\gamma$max. 216 (40,350); 272 (6,800); 280 (6,650); sh 284 (6,400); 291 (5,100).

*Analysis.*—Calcd. for $C_{19}H_{31}Cl_2N_3$: C, 61.27; H, 8.39; N, 11.29. Found: C, 61.07; H, 8.41; N, 11.15.

I claim:
1. A compound selected from the group consisting of 1 - (2 - diethylaminoethyl) - 3 - (1 - methyl - 2 - pyrrolidinyl)indole free base and dihydrochloride thereof.
2. 1 - (2 - diethylaminoethyl) - 3 - (1 - methyl - 2 - pyrrolidinyl)indole free base.
3. 1 - (2 - diethylaminoethyl) - 3 - (1 - methyl - 2 - pyrrolidinyl)indole dihydrochloride.
4. 1 - (2 - diethylaminoethyl) - 3 - (1 - methyl - 2 - pyrrolin-2-yl)indole.

References Cited by the Examiner
UNITED STATES PATENTS 3,109,844  11/63  Perron et al. _____ 260—319

IRVING MARCUS, *Primary Examiner.*

NICHOLAS S. RIZZO, *Examiner.*